United States Patent
Abuelsaad et al.

(10) Patent No.: US 10,931,850 B2
(45) Date of Patent: Feb. 23, 2021

(54) PROJECTOR DISPLAY CALIBRATION

(71) Applicant: International Business Machines Corporation, Armonk, NY (US)

(72) Inventors: Tamer E. Abuelsaad, Armonk, NY (US); Gregory J. Boss, Saginaw, MI (US); John E. Moore, Jr., Pflugerville, TX (US); Randy A. Rendahl, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 525 days.

(21) Appl. No.: 15/584,471

(22) Filed: May 2, 2017

(65) Prior Publication Data

US 2018/0324395 A1 Nov. 8, 2018

(51) Int. Cl.
| | | |
|---|---|---|
| *H04N 1/387* | (2006.01) | |
| *H04N 9/31* | (2006.01) | |
| *H04N 9/64* | (2006.01) | |
| *H04N 1/60* | (2006.01) | |
| *H04N 21/47* | (2011.01) | |
| *H04N 21/422* | (2011.01) | |
| *H04N 5/445* | (2011.01) | |

(52) U.S. Cl.
CPC ........... *H04N 1/387* (2013.01); *H04N 9/3182* (2013.01); *H04N 9/3194* (2013.01); *H04N 21/47* (2013.01); *H04N 1/6055* (2013.01); *H04N 5/445* (2013.01); *H04N 9/641* (2013.01); *H04N 21/422* (2013.01)

(58) Field of Classification Search
CPC .. H04N 1/387; H04N 5/44513; H04N 9/3182; H04N 9/3194; H04N 1/6055; H04N 5/445; H04N 9/641; H04N 21/422
USPC .......................................................... 353/69
See application file for complete search history.

(56) References Cited

U.S. PATENT DOCUMENTS

| | | | |
|---|---|---|---|
| 6,618,076 | B1 | 9/2003 | Sukthankar et al. |
| 7,215,362 | B2 | 5/2007 | Klose |
| 7,432,917 | B2 | 10/2008 | Wilson et al. |
| 2015/0015796 | A1* | 1/2015 | Stahl .................... H04N 9/3179 348/745 |

FOREIGN PATENT DOCUMENTS

| | | |
|---|---|---|
| CN | 105407305 A | 3/2016 |
| WO | 2016197802 A1 | 12/2016 |

* cited by examiner

*Primary Examiner* — Jerry L Brooks
(74) *Attorney, Agent, or Firm* — Joseph P. Curcuru; Gilbert Harmon, Jr.

(57) ABSTRACT

Embodiments describing an approach to generating, a calibration slide for a presentation. Receiving, a first image of the calibration slide. Receiving, a second image of the calibration slide, wherein the second image of the calibration slide is associated with the projector component. Analyzing, the first image of the calibration slide and the second image of the calibration slide, wherein the analysis comprises: comparing, display attributes between the first and second image of the calibration slide, and identifying, distortions in the second image of the calibration slide. Responsive to the analysis, calibrating, the display attributes of the presentation based on a preset user threshold of acceptance.

20 Claims, 4 Drawing Sheets

PROJECTOR DISPLAY CALIBRATION

BACKGROUND OF THE INVENTION

The present invention relates generally to the field of presentation calibration, and more particularly to optimizing computer and/or projector display settings automatically.

Many presenters have experienced disruptions and inconsistency in the way their presentations were displayed. There are various types of meetings, some are in person others are virtual. Regardless of the meeting type, projecting a presentation or demo can look very different from what a presenter intended or practiced with. The same presentation given in two different meeting rooms can differ vastly depending on projector layout and setup. This can be disruptive to the presenter and the clarity of the message he/she is trying to send to the audience. The lack of consistency between presentations can make a presenter appear to be unprofessional and incompetent, especially if the presenter is stumbling around trying to adjust their presentation, or even worse, the presenter is unable to get the presentation to display properly. The present invention calls for embodiments to reduce and/or remove the element of inconsistency in presentation display settings.

SUMMARY

Embodiments of the present invention disclose a method, a computer program product, and a system for calibrating a presentation.

According to one embodiment of the present invention, a computer implemented method includes generating, by one or more processors, a calibration slide for a presentation. Receiving, by the one or more processors, a first image of the calibration slide. Receiving, by the one or more processors, a second image of the calibration slide, wherein the second image of the calibration slide is associated with the projector component. Analyzing, by the one or more processors, the first image of the calibration slide and the second image of the calibration slide, wherein the analysis comprises: comparing, by the one or more processors, display attributes between the first and second image of the calibration slide, and identifying, by the one or more processors, distortions in the second image of the calibration slide. Responsive to the analysis, calibrating, by the one or more processors, the display attributes of the presentation based on a preset user threshold of acceptance.

DETAILED DESCRIPTION

Figure 1:
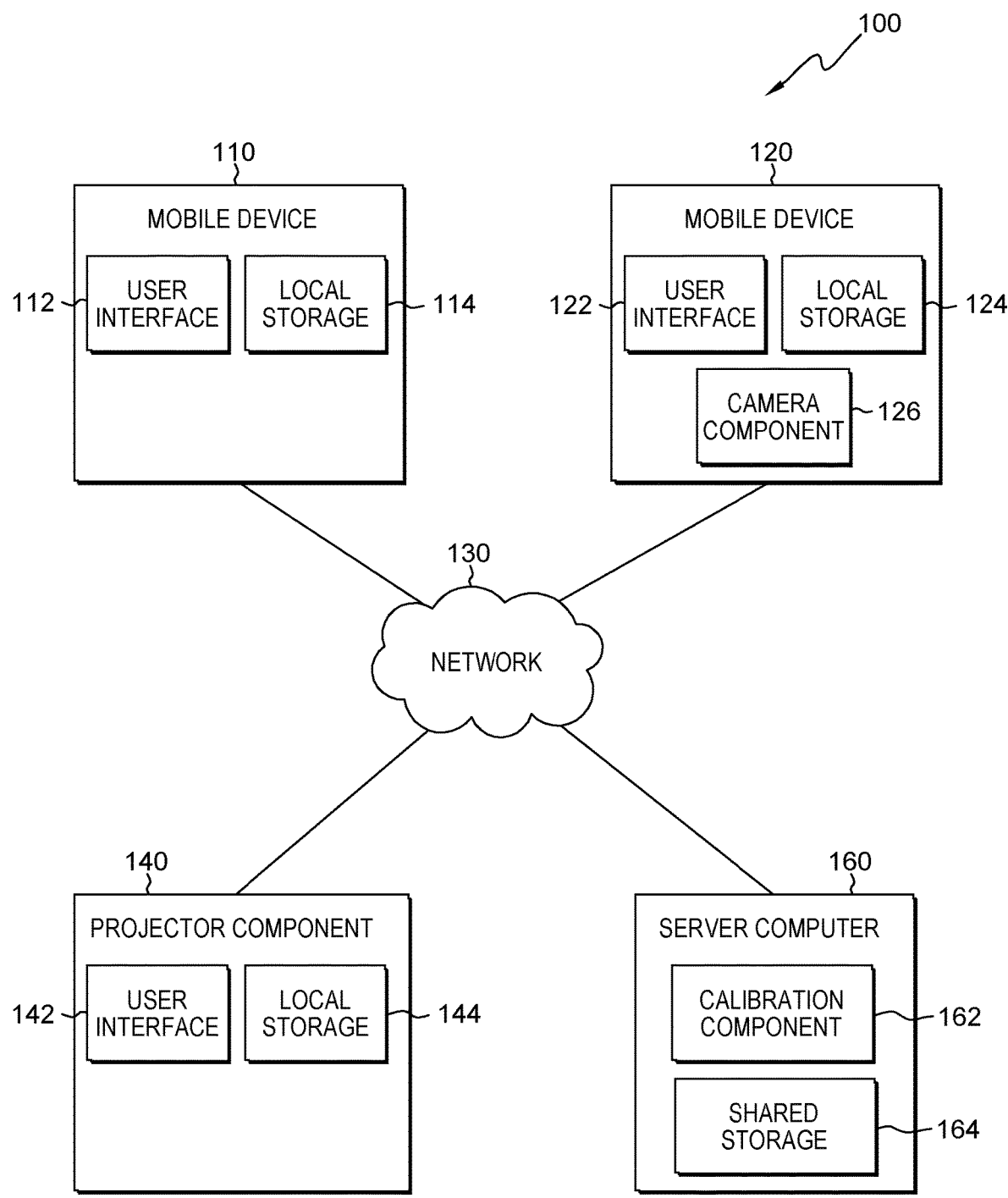
FIG. 1 is a functional block diagram illustrating a distributed data processing environment, in accordance with an embodiment of the present invention.

In presentation settings it is common to experience issues concerning the display quality and/or display compatibility, which can lead to improvised presentations and can make the presenter look unprofessional. For example, you spend hours making a presentation and when you go to present the presentation in person using a projector system the displayed presentation does not look the same as you prepared it and it appears distorted. There can be issues with color rendering, aspect ratio, brightness, fitting the entire content on the screen in a proper viewable space (boarding), and other issues known in the art. The audience may be unable to see varying color shades, or people on the left can't see what people on the right are seeing, or the bottom of the screen is cutoff, or the text on the slides appear to be stretched, etc. In another example, you are doing an online presentation, and the rendering of what you uploaded can vary drastically from what you see on your local computer. At this point it is not just a color issue, it can also be major changes to your slide layout (e.g., aspect ratio is askew, arrows missing, figures are not being displayed, etc.).

However, embodiments of the present invention improve the consistency of presentation display, which provides a better presentation experience for both the presenter and the audience. For example, instead of irritatingly attempting to adjust the presentation and/or projector settings, embodiments of the present invention can automatically adjust the projected presentation/display to the presenters liking in a consistent manner. Additionally, embodiments of the present invention can adjust the displayed presentation across a variety of platforms, such as, various projectors know in the art, web-based/online presentations, virtual presentations, LED televisions, LCD televisions, plasma televisions, DLP televisions, any other television known in the art. Further, embodiments of the present invention can systematically evaluate slides in the current deck and based on, but not limited to, the totality of fonts, colors, color combinations, font sizes and other display attributes, can dynamically create a calibration slide at the end of the deck. Continuing to explain some embodiments of the present invention, the user can then snap a photo of the calibration slide with their smart phone using a special app for the purpose, and then take a second photo of the calibration slide as it is displayed from a conference room projector. Embodiments of the present invention, compare the two photos to determine if any colors, combination of colors and/or any other display attributes are outside of a predetermined tolerance and can automatically adjust either the projector settings via wireless controls/APIs or the graphical presentation theme or settings to compensate for the color combination and shapes which did not show up correctly. The ability to consistently adjust a presentation to fit an ideal image in any presentation setting improves the art of presentations and projection technology.

Implementation of embodiments of the invention can take a variety of forms, and exemplary implementation details are discussed subsequently with reference to the Figures.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It can be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It can also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations can be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

FIG. 1 is a functional block diagram illustrating a distributed data processing environment, generally designated 100, in accordance with one embodiment of the present invention. The term "distributed" as used in this specification describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims. Distributed data processing environment 100 includes mobile device 110, mobile device 120, projector 140, server computer 160, and network 130.

Distributed data processing environment 100 includes mobile device 110, mobile device 120, and projector component 140 interconnected over network 130. Network 130 can be, for example, a telecommunications network, a local area network (LAN), a wide area network (WAN), such as the Internet, or a combination of the three, and can include wired, wireless, or fiber optic connections. Network 130 can include one or more wired and/or wireless networks that are capable of receiving and transmitting data, voice, and/or video signals, including multimedia signals that include voice, data, and video information. In general, network 130 can be any combination of connections and protocols that will support communications between mobile device 110, mobile device 120 and/or projector component 140. In various embodiments, not depicted in FIG. 1, mobile device 110, mobile device 120, and/or projector component 140 can be connected through a wired connected.

In various embodiments projector component 140 can be, but is not limited to, a standalone device, any television known in the art, virtual presentation, a digital light processing (DLP) projector, a liquid crystal on silicon (LCoS) projector, a Liquid Crystal Display (LCD) projector, Light Emitting Diode (LED) projector, a laser video projector, any image projecting system with a display screen and/or any presentation system known in the art. In another embodiment, projector component 140 represents a computing system utilizing clustered computers and components to act as a single pool of seamless resources. In general, projector component 140 can be any server computer or a combination of devices with access to some or all of server computer 160 and/or mobile device 110, and/or mobile device 120 via network 130, and with accessibility to be adjusted and/or calibrated by mobile calibration component 162. Projector component 140 may include internal and external hardware components, as depicted and described in further detail with respect to FIG. 4. In various embodiments, projector component 140 comprises user interface (UI) 142 and local storage 144, in which user interface (UI) 142 executes locally on projector component 140 and operates to provide a UI to a user projector component 140. In various embodiments, UI 142 can be controlled via a mobile application housed on mobile device 120 and/or mobile device 110.

In an exemplary embodiment, user interface (UI) 112 is on mobile device 110, user interface (UI) 122 is on mobile device 120, and user interface (UI) 142 is on projector component 140, in which UI 112, UI 142, and UI 122 execute locally on mobile device 110, projector component 140 and/or mobile device 120. In other embodiments, UI 112, UI 122, and/or UI 142 can reside on another mobile device, server computer, and or projector component, provided that each can access and is accessible by calibration component 162, server computer 160, and each other. UI 112, UI 142, and UI 122 can operate to provide a UI to a user of mobile device 110, mobile device 120, server computer 160, and/or or projector component 140. For example, a user can set, adjust, and/or calibrate presentation settings through UI 112, UI 122, and/or UI 142. UI 112, UI 142, and UI 122 further operate to receive user input from a user via the provided user interface, thereby enabling the user to interact with mobile device 110, projector component 140, server computer 160, and/or mobile device 120.

In one embodiment, UI 112 and/or UI 122 can provide a user interface that enables a user of mobile device 110 and/or mobile device 120 to interact with calibration component 162. For example, a user can adjust the display settings on projector component 140, and/or edit presentation slides on mobile device 120. Display settings and/or general settings can be, but are not limited to color density, border ratio, aspect ratio, pixels, brightness, contrast, sharpness, color balance, saturation, frequency, tracking, display mode, wall color, tint, H-position, V-position, white peaking, digamma, color adjustment, and/or any other display, video, and/or projector setting known in the art. For example, a user can adjust the boundaries, color density, saturation, and aspect ratio of a presentation being displayed from projector component 140. In other various embodiments, UI 112, UI 142, and/or UI 122 can act as a display screen and/or monitor. In other embodiments, UI 112, UI 142, and/or UI 122 can be a button display, projector display, and/or receive sound, images, receive touch response, videos, documents, data, graphs, and/or any other form of communication data known in the art.

In various embodiments, mobile device 110 and/or mobile device 120 can be, but are not limited to, a standalone device, a server, a laptop computer, a tablet computer, a netbook computer, a personal computer (PC), a smart phone, a desktop computer, a smart television, a smart watch, or any combination thereof. In the exemplary embodiment, mobile device 120 has photograph and/or video taking capabilities (i.e., a camera and/or video camera). In other embodiments, mobile device 110 and/or mobile device 120 can possess camera component 126. In general, mobile device 110 and/or mobile device 120 can be representative of any programmable mobile device and/or a combination of programmable mobile devices capable of executing machine-readable program instructions and communicating with users of other mobile devices via network 130 and/or capable of executing machine-readable program instructions and communicating with server computer 160. In various embodiments, mobile device 110 and/or mobile device 120 can host a plurality mobile device applications, in which the mobile device application(s) can transmit information and/or alter settings (i.e., display settings) between mobile device 110, mobile device 120, and/or projector component 140.

In various embodiments, camera component 126 operates to take photographs using a camera attached to the mobile device 120. In the exemplary embodiment, camera component 126 is housed on mobile device 120; however, in other embodiments not depicted in FIG. 1, camera component 126 can also be housed on mobile device 110, be a standalone device (i.e., a camera and/or video camera), projector component 140, and/or server computer 160. In various embodiments, camera component 126 can be, but is not limited to, a camera and/or video camera embedded in a mobile device, a standalone camera, a standalone video camera, a system and/or group of camera's and/or video cameras, and/or any combination therein. Generally, in various embodiments, camera component 126 can capture images and/or video.

In various embodiments, local storage 114, local storage 124, and shared storage 164 can be a data repository and/or a database that may be written to and read by one or a combination of mobile device 110, mobile device 120, projector component 140, and/or server computer 160. Local storage 114, local storage 124, and/or shared storage 164 can be connected via network 130 or connected through a cable and or wired connection. Local storage 114, local storage 124, and shared storage 164 can be hard drives, memory cards, computer output to laser disc (cold storage), and or any form of data storage known in the art. In one embodiment, not illustrated in FIG. 1, local storage 114 and/or local storage 124 can be housed on server computer 140 and/or standalone devices and accessed via network 130. In other embodiments, shared storage 164 can be a standalone device. In various embodiments, local storage 114, local storage 124, and shared storage 164 can be a cloud based data repository.

In various embodiments, calibration component 160 can save calibration data on local storage 114, local storage 124, and/or shared storage 164; additionally, calibration component 160 can access previously saved settings from local storage 114, local storage 124, and/or shared storage 164 to retrieve saved calibration data and use the retrieved calibration data to calibrate a presentation. In various embodiments, calibration data can comprise calibration settings to the presentation and/or projector component 160, graphical interface changes, instructions, and/or suggestions. In other embodiments, a user can save calibration data and/or be prompted to save calibration data by calibration component 160 and create a calibration data repository that can be retrieved and used at a later time. For example, a user previously presented in the offices conference room a week prior to the current presentation, the user can notify calibration component 160 of what conference room the presentation is being conducted, and retrieve the previously used calibration data for projector component 140 accordingly. In various embodiments, calibration component 160 can enable users to create files and/or folders and save calibration data, preferences, instructions and/or suggestions along with projector component 140 makes and models to local storage 114, local storage 124, and/or shared storage 164. In other embodiments, calibration component 160 enables users to upload and/or access projector component 140 manuals and/or instructions to and from local storage 114, local storage 124, and/or shared storage 164.

In various embodiments, server computer 160 can be a desktop computer, a laptop computer, a tablet computer, a specialized computer server, a smartphone, a smart TV, a smart watch, a cloud based server network, a server computer or any other computer system known in the art. In certain embodiments, server computer 160 represents a computer system utilizing a cluster computers and components that act as a single pool of seamless resources when accessed through network 130, as is common in data centers and with cloud computing applications. In general, server computer 160 is representative of any programmable mobile device or combination of programmable client devices capable of executing machine-readable program instructions and communicating with other computer devices via a network (i.e., network 130).

In the exemplary embodiment, calibration component 162 is housed on server computer 140; however, in other embodiments not depicted in FIG. 1, calibration component 162 can be housed on mobile device 110, mobile device 120, projector component 140, and/or on a separate server computer. In various embodiments, calibration component 162 can be accessed through a mobile application housed on mobile device 110, projector component 140, and/or mobile device 120. In some embodiments, calibration component 162 can identify display attributes, which can be, but are not limited to: color patterns, color density, pattern matching, color matching, border ratio, aspect ratio, pixels, brightness, contrast, sharpness, color balance, fuzziness, saturation, frequency, tracking, display mode, wall color, tint, H-position, V-position, white peaking, digamma, color adjustment, and/or any other display, video, and/or projector setting known in the art. In various embodiments, calibration component 162 can automatically calibrate and/or adjust the display settings on projector component 140, mobile device 120, and/or mobile device 110. In other embodiments, calibration component 162 can suggest calibration settings and/or enable the user to manually adjust the display settings on projector component 140, mobile device 120, and/or mobile device 110. In various embodiments, a user can set display preferences, in which includes a level and/or degree of acceptance (i.e., a threshold) that the user is willing to accept, in the event calibration component 162 is unable to achieve the optimal calibration. Calibration component 162 is depicted and described in further detail with respect to FIG. 2.

Figure 2:
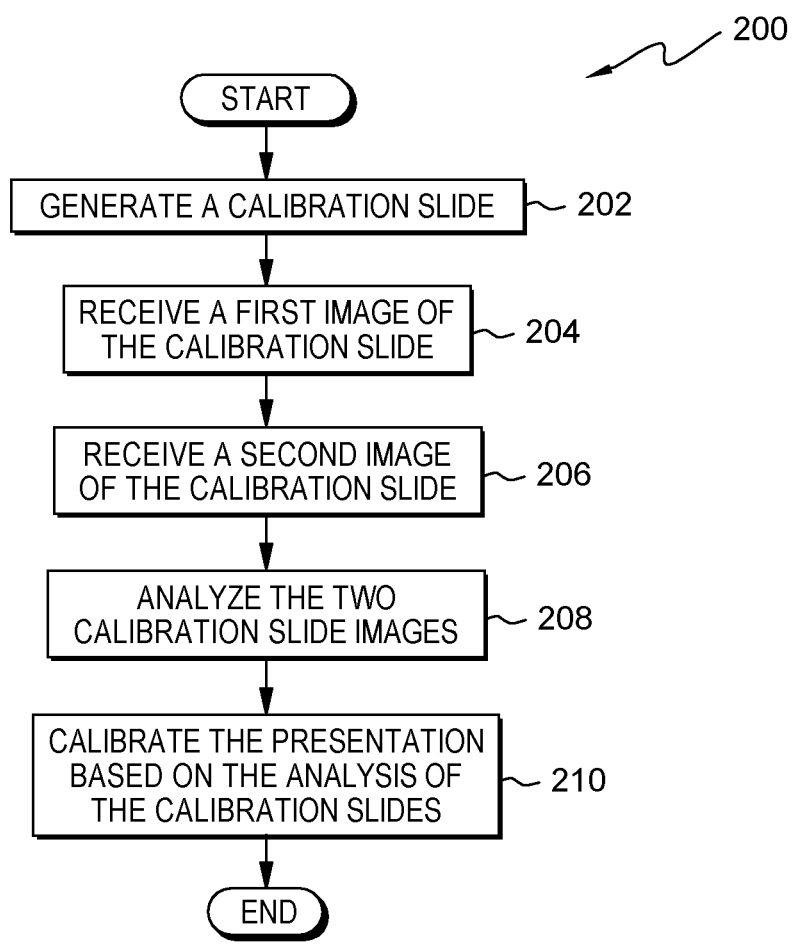
FIG. 2 illustrates operational steps of calibration component, on a client device within the distributed data processing environment of FIG. 1, in accordance with an embodiment of the present invention.

FIG. 2 is a flowchart depicting operational steps of calibration component 162, generally designated 200, on server computer 160, within distributed data processing environment 100 of FIG. 1. FIG. 2 provides only an illustration of one implementation and does not imply any limitations with regard to the environments in which different embodiments can be implemented. Modifications to the depicted environment can be made by those skilled in the art without departing from the scope of the invention as recited by the claims.

In step 202, calibration component 162 generates a calibration slide. In various embodiments, calibration component 162 systematically evaluates slides in a deck (i.e., presentation) and based on the totality of fonts, colors, color combinations, font sizes, brightness, color density, border ratio, aspect ratio, pixels, brightness, contrast, sharpness, color balance, and/or any other combination of display attributes creates a calibration slide at the end of the presentation. For example, once a user creates a presentation on a laptop or personal computer, calibration component 162 will automatically evaluate the display attributes of the presentation slides and generate a calibration slide. In other embodiments, once a user finishes creating a presentation, the user can instruct calibration component 162 to generate a calibration slide and select which display attributes calibration component 162 should analyze. In other embodiments, calibration component 162 can generate a calibration slide for a slideshow and/or any other form of electronic and/or digital presentation.

In step 204, calibration component 162 receives a first image of the calibration slide. In various embodiments, calibration component 162 receives a first image of the calibration slide from mobile device 120, via a combination of a mobile application and camera component 126. For example, a user opens a calibration mobile application on a smartphone and takes a picture/photograph of the calibration slide as it is displayed on the computer and/or laptop. In this particular example, mobile device 110 can be a laptop computer and/or a tablet and mobile device 120 can be a smartphone; however, in other embodiments the roles can be reversed. In various embodiments, not depicted in FIG. 1, mobile device 120 can be a tablet, a personal computer, and/or a laptop in which a user creates a presentation, and mobile device 110 may not be needed and/or present in environment 100. Similarly, in other embodiments, mobile device 120 may not be needed and/or present in environment 100, and mobile device 110 can be acting as a laptop, personal computer, and/or a table and can possess camera component 126. In various embodiments, the picture can be taken by camera component 126 and uploaded to a mobile application enabling access to calibration component 162 and/or the mobile application can utilize mobile device 120 camera component to directly take the picture using the mobile application. For example, the user opens the calibration component mobile application, which prompts the user to enable the mobile application to access camera component 126, and enable the user to take a first picture of the calibration slide. In other embodiments, the user can upload pictures, screenshots, and/or videos of the calibration slide to calibration component 162 for analysis. For example, a user can take a screen shot of the calibration slide on mobile device 110 and upload it to calibration component 162, via a mobile application.

In other embodiments, a user can take and/or upload a first video of the calibration slide, in which can be sent to and/or received by calibration component 162. For example, a user's camera is unable to keep up with the refresh rate of the computer monitor and the picture appears distorted, in this instance, the user can take a video of calibration slide and submitted to calibration component 162 for analysis. In this particular example, the video can be take using camera component 126, in which the user uploads the video to calibration component 162 software and/or mobile application, and/or the mobile application can enable to user to take the video directly through the mobile application in conjunction with camera component 126. In various embodiments, calibration component 162 can display a presentation and/or the calibration slide from projector component 140, via mobile device 110 and/or mobile device 120. The projected presentation slide and/or calibration slide in conjunction with the calibration slide on mobile device 110 and/or mobile device 120 can be used by calibration component 162 to calibrate the presentation. In other embodiments, the calibration slide is projected from projector component 140 so a user can take a photograph and/or video of the calibration slide as it appears being displayed on projector component 140.

In step 206, calibration component 162 receives a second image of the calibration slide. In various embodiments, calibration component 162 receives a second image of the calibration slide from mobile device 120, via a combination of a mobile application and camera component 126. In a particular embodiment, a user uses mobile device 120 to take a picture of the calibration slide that is being displayed on and/or from projector component 140. For example, a user sets up the presentation in the board room and projects the calibration slide onto a projector screen using an LCD projector, the user then uses a smartphone to take a picture/photograph of the calibration slide as it displayed on the projector screen, via a calibration component 162 mobile application. In other embodiments, in the event the user is using a virtual meeting and/or remote meeting software and/or website the user can take and/or upload a screen shot of the presented calibration slide. In different embodiments, the presentation can be displayed on a television monitor, in which the user can take a picture of the calibration slide as it is displayed on the television monitor. In various embodiments, a user displays the presentation on and/or from projector component 140 and then takes the second photograph/image of the presentation as it appears being displayed on and/or from projector component 140.

In other embodiments, a user can take and/or upload a second video of the calibration slide, in which can be sent to and/or received by calibration component 162. For example, a user's camera is unable to keep up with the refresh rate of the computer monitor and the picture appears distorted, in this instance, the user can take a video of calibration slide and submitted to calibration component 162 for analysis. In this particular example, the video can be take using camera component 126, in which the user uploads the video to calibration component 162 software and/or mobile application, and/or the mobile application can enable to user to take the video directly through the mobile application in conjunction with camera component 126. In various embodiments, calibration component 162 can receive the image of the calibration slide associated with projector component 140 first, and receive the image of the calibration slide associated with a mobile device (i.e., mobile device 110 and/or mobile device 120) second.

In step 208, calibration component 162 analyzes the two calibration slide images. In various embodiments, calibration component 162 analyzes the display attributes between the two images/pictures and/or videos and/or any combination therein, and identifies the differences/distortions in the displayed image and/or attributes between the first and second calibration pictures. In various embodiments, differences and distortion(s) can be used interchangeably and can possess the same definition. In various embodiments, calibration component 162 can identify distortion(s) through pattern matching, color matching (i.e., measuring the amount of red, green, and blue using quantifiable numbers), color density differences, defining edges, border ratio, aspect ratio, pixels, brightness, contrast, sharpness, color balance, saturation, frequency, tracking, display mode, wall color, tint, H-position, V-position, white peaking, digamma, color adjustment, and/or any other display settings and/or attributes known in the art, between the first and second image. Additionally, in various embodiments, calibration component 162 analyses the first and second picture by applying known image similarity detection algorithms, and any image that is less than a preset threshold of similarity and/or preset user threshold of acceptance can be considered imperfect and/or distorted.

In various embodiments, a user can set and/or determine a threshold that establishes a parameter of acceptable quality for calibration component 162. For example, a user can instruct calibration component 162 that it is acceptable to display the presentation within 5% of the calibration slide and/or recommended calibration settings generated from the calibration analysis. In other embodiments, calibration component 162 enables the user to select varying degrees of acceptance. Additionally, in various embodiments, calibration component 162 enables users to select various degrees of acceptance (i.e., user threshold of acceptance) of coloration, pigmentation, fuzziness, pattern matching, color matching (i.e., measuring the amount of red, green, and blue using quantifiable numbers), color density differences, defining edges, border ratio, aspect ratio, pixels, brightness, contrast, sharpness, color balance, saturation, frequency, tracking, display mode, wall color, tint, H-position, V-position, white peaking, digamma, color adjustment, and/or any other display settings and/or attributes known in the art.

For example, a user is presenting at a teeth whitening convention and the colors on the presentation are vital to the presentation; however, when the presentation is projected on to the projector screen and the user notices the coloring on the presentation appears out of tolerance. In this particular example, the user takes a photo of the calibration slide on his laptop and a second photo of the calibration slide as it is displayed on the projector screen. Continuing this particular example, calibration component 162 analyzes the display attributes and adjusts the brightness, color density, color balance, color matching, and tint on the projector so the second image of the calibration slide matches the first image of calibration slide (i.e., matches the presentation as it appears on the user's laptop). In other embodiments, calibration component 162 can generate and/or create calibration data (i.e., calibration suggestions, preferred settings, and/or instructions) based on the analysis of the two calibration slide photographs, in which a user can use the generated and/or created calibration data to manually calibrate the presentation. In various embodiments, the calibration data can outline calibration information for the user to calibrate/adjust the presentation on mobile device 110, mobile device 120, and/or mobile device 140.

In step 210, calibration component 162 calibrates the presentation based on the analysis of the two calibration slides. In various embodiments, after identifying the difference in display attributes between the first and second picture of the calibration slide, calibration component 162 can suggest calibration instructions to the user and/or automatically adjust/calibrate the projected presentation either by altering settings on projector component 140, mobile device 110 and/or mobile device 120. For example, calibration component 162 can automatically calibrate the settings/display settings on mobile device 110, via a mobile application on mobile device 120. In another example, calibration component 162 can display options and/or suggestions to adjust projector component 140 settings/display settings, via a mobile application on mobile device 120. In different embodiments, mobile device 110 can host a calibration mobile application. In other embodiments, calibration component 162 can make real-time changes and/or adjustments to the attributes of the presentation in order to make the presentation more visible, match the calibration slide, and/or more fit within the user preferences. In various embodiments, calibration component 162 automatically adjusts either the projector settings via wireless controls/APIs or calibration component 162 changes the graphical presentation theme or settings to compensate for the color combination and/or other display attributes that did not display correctly. In other embodiments, calibration component 162 can present a prompt to the user asking the user if they would like to accept the changes, adjustments, and/or calibrations made to the presentation and/or projector component 140.

In some embodiments, calibration component 162 can enable the user to manually adjust/calibrate the presentation using mobile device 120 and/or mobile device 110. In other embodiments, calibration component 162 can provide detailed instructions on how to calibrate the presentation whether it is from mobile device 110, mobile device 120 and/or directly manually adjusting the settings on projector 140 via user interface 142. In some embodiments, using the calibration component 162 mobile application, website, and/or software, calibration component 162 can prompt the user to enter projector component 140 make and model number, in which calibration component 162 can retrieve calibration information and/or instructions from a data repository (i.e., shared storage 164). In other embodiments, calibration component 162 can prompt a user to save the calibration settings, which can be stored on local storage 114, local storage 124, and/or shared storage 164 and accessed at a later date. In some embodiments, calibration component 162 can prompt a user to save the calibration settings for the particular presentation and the particular projector component 140 make and model.

Figure 3:
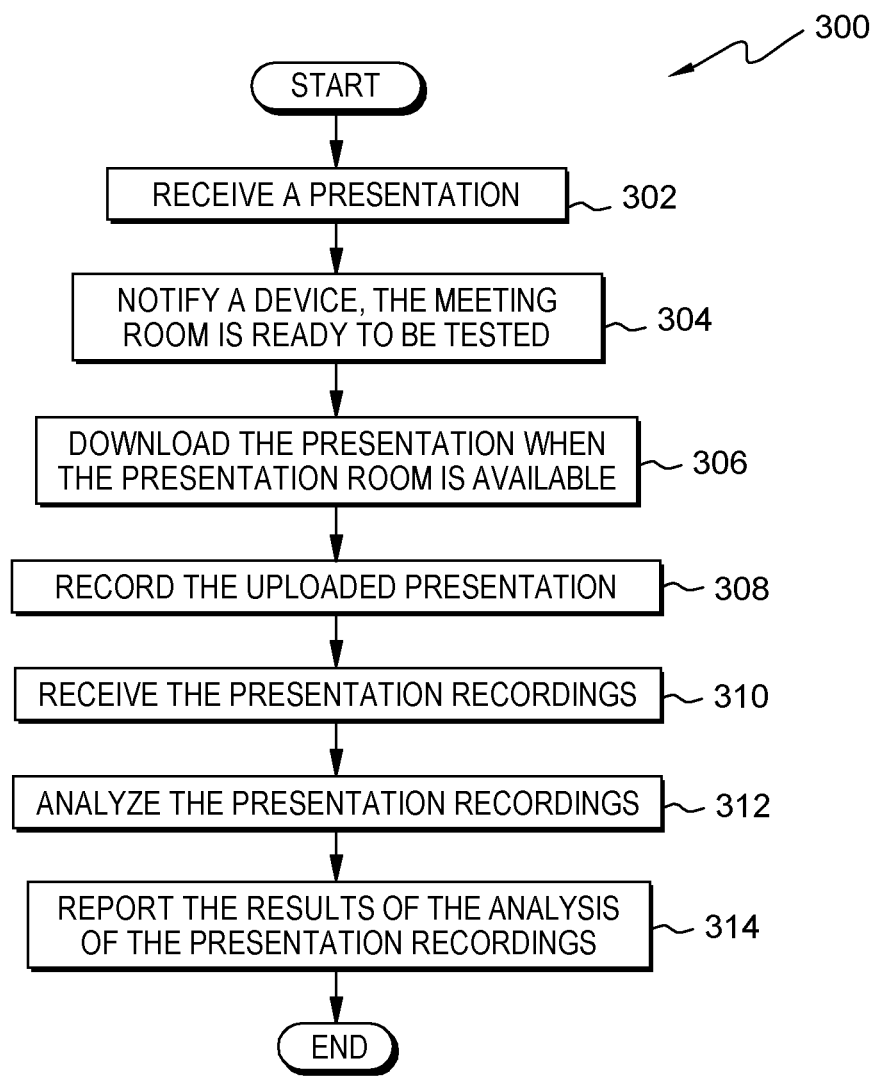
FIG. 3 depicts operational steps of components of calibration component within the distributed data processing environment of FIG. 1, in accordance with an embodiment of the present invention.

FIG. 3 is a flowchart depicting operational steps of calibration component 162, generally designated 300, on mobile device 110, within distributed data processing environment 100 of FIG. 1. FIG. 3 provides only an illustration of one implementation and does not imply any limitations with regard to the environments in which different embodiments can be implemented. Modifications to the depicted environment can be made by those skilled in the art without departing from the scope of the invention as recited by the claims.

In step 302, calibration component 162 receives a presentation. In various embodiments, the user uploads a presentation to a remote server (i.e., server computer 160), in which calibration component 162 receives the presentation. In other embodiments, the user uploads the presentation to server computer 160 and selects a meeting room to present the presentation; additionally, if the user knows the make and/or model of projector component 140 in the selected presentation room the user can submit it to calibration component 162, in which calibration component 162 can retrieve calibration information from shared storage 160.

In step 304, calibration component 162 notifies a user and/or a device, that the meeting room is ready to be tested. In various embodiments, calibration component 162 can notify mobile device 110, projector component 140, and/or mobile device 120 that there is a presentation ready to be tested. The user can receive text, call, email, inbox message, and/or any other form of notification in the art. In alternative embodiments, calibration component 162 notifies an in-room recording system that the room is ready to be tested. In other embodiments, calibration component 162 can notify an in-room service and/or device and can work in conjunction with another system and/or program. For example, calibration component 162 can operate and/or manage appointment scheduling and/or an in-room recording system and/or work in conjunction with one or more systems and/or programs that operate and manage room scheduling and presentation recordings.

In step 306, calibration component 162 can download the presentation when the presentation room is available. In various embodiments, when calibration component 162 identifies that the room is available for a certain block of time, calibration component 162 can download and/or upload the presentation for testing. In an alternative embodiment, calibration component 162 can be notified by a separate in room scheduling system that can notify projection component 140 and/or calibration component 162 that the room is available, and it is okay to begin testing the presentation, in which calibration component 162, can download the presentation to projector component 140 in the meeting room.

In step 308, calibration component 162 records the uploaded presentation. In various embodiments, calibration component 162 can turn on various recording cameras and can display a visual and/or auditory indicator that a testing session is in progress. In various embodiments, calibration component 162 can work in conjunction with one or more systems and can receive instructions from the one or more systems. For example, calibration component 162 can receive instructions from the in-room recording system to download and play the presentation, while the in-room recording system records the presentation. In other embodiments, calibration component 162 can be equipped with motion and noise sensors to determine if the meeting room is truly vacant, and the sensors can instruct calibration component 162 to stop recording if the sensors are triggered. In various embodiments, calibration component 162 can scroll through the presentation material while the various cameras perform the recording, and can record a timestamp of when each slide begins and ends as the presentation progresses. In various embodiments, calibration component 162 produces metadata about the presentation run-through, which is used for denoting timestamp information during the presentation run-through. In various embodiments, the metadata produced, collected and/or tagged to presentation slides by calibration component 162 can pertain to slide transition times, which can be slightly more complicated in that an animation on a single slide can take a set of actions to navigate through. In other embodiments, the metadata produced, collected and/or tagged to presentation slides by calibration component 162 can pertain to metadata about the room comprising, but not limited to: descriptive locations of the cameras and/or display screen, camera angles, camera distance from the screen, brightness of the room, the type of lighting, type of light bulb, time of day, the type of projector component 140, and/or any other form of data related to a presentation room known in the art.

In various embodiments, once the presentation completes its run-through, calibration component 162 collects all the video recordings from the various cameras, labels each video accordingly, annotates the video with slide transition timestamps, and can upload the video recordings to server computer 160, shared storage 160, local storage 114, and/or local storage 124. In various embodiments, calibration component 162 can make the video recordings available to the presenter for analysis. In some embodiments, calibration component 162 can take one video of the entire presentation, or take several videos of the presentation. In other embodiments, calibration component 162 takes a video and/or picture of each individual slide. In various embodiments, the user can select how many videos calibration component 162 should take, the user can select for calibration component 162 to record individual slides, group 2 slides per video, 3 slides per video, etc. For example, the user has a 100 slide presentation and doesn't want 100 individual videos, so the user instructs calibration component 162 to record 5 slides per video.

In step 310, calibration component 162 receives the presentation recordings. In various embodiments, calibration component 162 receives the recordings with the slide transition timestamp. In other embodiments, calibration component 162 receives the recording of the presentation from a separate system (i.e., an in-room recording system). In alternative embodiments, calibration component 162 can retrieve the recordings of the presentation from server computer 160, shared storage 160, local storage 114, and/or local storage 124.

In step 312, calibration component 162 analyzes the presentation recordings. In various embodiments, calibration component 162 analyzes each individual recording and compares it to individual slides of the presentation. In this particular embodiment, calibration component 162 can compare the captured recordings to the presentation slides by applying known image similarity detection algorithms, and any video and/or image that is less than a preset threshold of similarity can be considered imperfect and/or distorted. In various embodiments, calibration component 162 can identify distortion through pattern matching, color matching (i.e., measuring the amount of red, green, and blue using quantifiable numbers), color density differences, defining edges, border ratio, aspect ratio, pixels, brightness, contrast, sharpness, color balance, fuzziness, saturation, frequency, tracking, display mode, wall color, tint, H-position, V-position, white peaking, digamma, color adjustment, and/or any other display settings and/or attributes known in the art, between the record presentation and slides displayed on mobile device 110 and/or mobile device 120. In some embodiments, if any frames are identified as being distorted, the frames can be mapped to their equivalent slides using the slide transition timestamp metadata provided. In other embodiments, aside from videos and/or recordings, calibration component 162 can analyze images such as screen shots and/or pictures.

Figure 4:
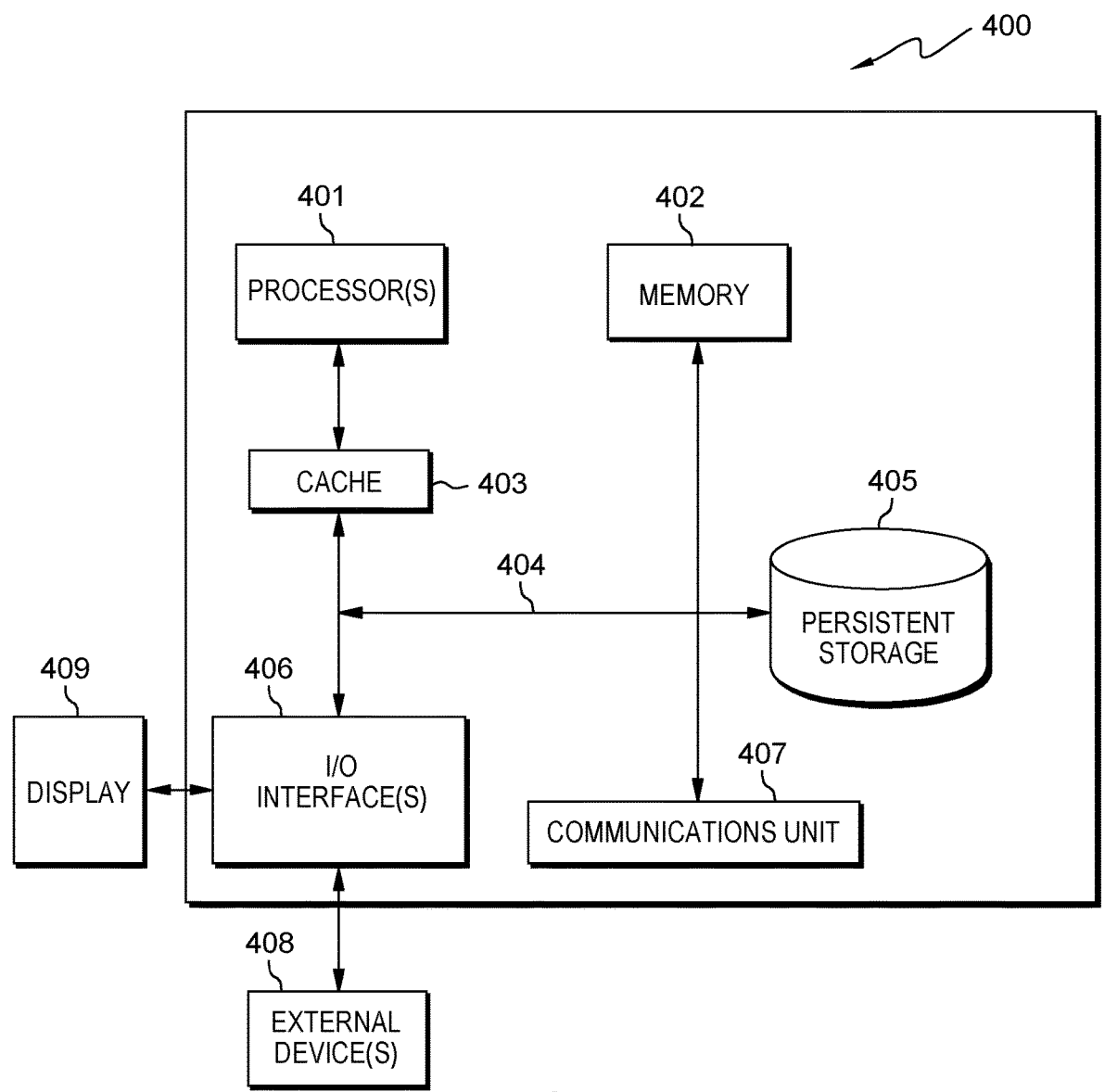
FIG. 4 is a block diagram of components of a computing device capable of executing operations for calibrating a presentation, in accordance with an embodiment of the present invention.

In step 314, calibration component 162 reports the results of the analysis of the presentation recordings. In various embodiments, calibration component 162 can collect the results and share the results with the user. In other embodiments, calibration component 162 can provide the user with calibration advice and/or instructions. In some embodiments, calibration component 162 can automatically calibrate and/or adjust the presentation and/or projector component 140. In other embodiments, calibration component 162 can present a prompt to the user asking the user if they would like to accept the changes, adjustments, and/or calibrations made to the presentation and/or projector component 140. In various embodiments, FIG. 4 depicts a block diagram of components of server computer 104 within distributed data processing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

FIG. 4 depicts a block diagram of components of a computing device within distributed data processing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

FIG. 4 depicts computer system 400, where server computer 160 represents an example of computer system 400 that includes calibration component 162. The computer system includes processors 401, cache 403, memory 402, persistent storage 405, communications unit 407, input/output (I/O) interface(s) 406 and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processors 401 by holding recently accessed data, and data near recently accessed data, from memory 402.

Program instructions and data used to practice embodiments of the present invention may be stored in persistent storage 405 and in memory 402 for execution by one or more of the respective processors 401 via cache 403. In an embodiment, persistent storage 405 includes a magnetic hard disk drive. Alternatively, or in addition to a magnetic hard disk drive, persistent storage 405 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data used to practice embodiments of the present invention may be downloaded to persistent storage 405 through communications unit 407.

I/O interface(s) 406 enables for input and output of data with other devices that may be connected to each computer system. For example, I/O interface 406 may provide a connection to external devices 408 such as a keyboard, keypad, a touch screen, and/or some other suitable input device. External devices 408 can also include portable computer readable storage media such as, for example, thumb drives, portable optical or magnetic disks, and memory cards. Software and data used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor.

What is claimed is:

1. A method for calibrating a presentation, the method comprising:
   generating, by one or more processors, a calibration slide for a presentation;
   receiving, by the one or more processors, a first image of the generated calibration slide;
   receiving, by the one or more processors, a second image of the generated calibration slide, wherein the second image of the calibration slide is associated with a projector component;
   analyzing, by the one or more processors, the first image of the calibration slide and the second image of the calibration slide, wherein the analysis comprises:
      comparing, by the one or more processors, display attributes between the first and second image of the calibration slide; and
      identifying, by the one or more processors, distortions in the second image of the calibration slide;
   responsive to the analysis, calibrating, by the one or more processors, the display attributes of the presentation based on a preset user threshold of acceptance;
   prompting a user, by a calibration component, to save calibration data and the calibration settings for the presentation and make and model of the projector component;
   saving, by the one or more processors, the calibration data to a database, wherein the saved calibration data can be accessed and used to calibrate a presentation and wherein the calibration data comprises: calibration settings for the presentation, the projector component and graphical interface changes, instructions, and suggestions; and
   responsive to receiving a notification of a conference room in which a presentation is being conducted, retrieving, by the one or more processors, previously used calibration data associated with the projector component.

2. The method of claim 1, wherein the calibrating further comprises suggesting setting and display attribute adjustments to be made to at least one mobile device, or the projector component.

3. The method of claim 1, wherein the first image of the calibration slide and the second image of the calibration slide can be videos.

4. The method of claim 1, wherein the calibrating further comprises automatically calibrating the presentation.

5. The method of claim 1 further comprising:
   generating, by the one or more processors, calibration data.

6. The method of claim 5 further comprising:
   storing, by the one or more processors, calibration data; and
   retrieving, by the one or more processors, calibration data.

7. The method of claim 1, wherein the display attributes comprise:
   color patterns, color matching, pattern matching, color density, border ratio, aspect ratio, pixels, brightness, contrast, sharpness, color balance, fuzziness, saturation, frequency, tracking, display mode, tint, H-position, V-position, white peaking, digamma, and color adjustment.

8. A computer program product for calibrating a presentation, the computer program product comprising:
   one or more computer readable storage devices and program instructions stored on the one or more computer readable storage devices, the stored program instructions comprising:
   program instructions to generate a calibration slide for a presentation;
   program instructions to receive a first image of the generated calibration slide;
   program instructions to receive a second image of the generated calibration slide, wherein the second image of the calibration slide is associated with a projector component;
   program instructions to analyze the first image of the calibration slide and the second image of the calibration slide, wherein the analysis comprises:
      program instructions to compare display attributes between the first and second image of the calibration slide; and
      program instructions to identify distortions in the second image of the calibration slide;
   responsive to the analysis, program instructions to calibrate the display attributes of the presentation based on a preset user threshold of acceptance;
   program instructions to prompt a user, by a calibration component, to save calibration data and the calibration settings for the presentation and make and model of the projector component;

program instructions to save the calibration data to a database, wherein the saved calibration data can be accessed and used to calibrate a presentation and wherein the calibration data comprises: calibration settings for the presentation, the projector component and graphical interface changes, instructions, and suggestions; and responsive to receiving a notification of a conference room in which a presentation is being conducted, program instructions to retrieve previously used calibration data associated with the projector component.

9. The computer program product of claim 8, wherein the calibrating further comprises suggesting setting and display attribute adjustments to be made to at least one mobile device, or the projector component.

10. The computer program product of claim 8, wherein the first image of the calibration slide and the second image of the calibration slide can be videos.

11. The computer program product of claim 8, wherein the calibrating further comprises automatically calibrating the presentation.

12. The computer program product of claim 8 further comprising:
program instructions to generate calibration data.

13. The computer program product of claim 12 further comprising:
program instructions to store calibration data; and
program instructions to retrieve calibration data.

14. The computer program product of claim 8, wherein the display attributes comprise: color patterns, color matching, pattern matching, color density, border ratio, aspect ratio, pixels, brightness, contrast, sharpness, color balance, fuzziness, saturation, frequency, tracking, display mode, tint, H-position, V-position, white peaking, digamma, and color adjustment.

15. A computer system for calibrating a presentation, the computer system comprising:
one or more computer processors;
one or more computer readable storage devices;
program instructions stored on the one or more computer readable storage devices for execution by at least one of the one or more computer processors, the stored program instructions comprising:
program instructions to generate a calibration slide for a presentation;
program instructions to receive a first image of the generated calibration slide;
program instructions to receive a second image of the generated calibration slide, wherein the second image of the calibration slide is associated with a projector component;
program instructions to analyze the first image of the calibration slide and the second image of the calibration slide, wherein the analysis comprises:
program instructions to compare display attributes between the first and second image of the calibration slide; and
program instructions to identify distortions in the second image of the calibration slide;
responsive to the analysis, program instructions to calibrate the display attributes of the presentation based on a preset user threshold of acceptance;
program instructions to prompt a user, by a calibration component, to save calibration data and the calibration settings for the presentation and make and model of the projector component;
program instructions to save the calibration data to a database, wherein the saved calibration data can be accessed and used to calibrate a presentation and wherein the calibration data comprises: calibration settings for the presentation, the projector component and graphical interface changes, instructions, and suggestions; and
responsive to receiving a notification of a conference room in which a presentation is being conducted, program instructions to retrieve previously used calibration data associated with the projector component.

16. The computer system of claim 15, wherein the calibrating further comprises suggesting setting and display attribute adjustments to be made to at least one mobile device, or the projector component.

17. The computer system of claim 15, wherein the first image of the calibration slide and the second image of the calibration slide can be videos.

18. The computer system of claim 15, wherein the calibrating further comprises automatically calibrating the presentation.

19. The computer system of claim 15 further comprising:
program instructions to generate calibration data;
program instructions to store calibration data; and
program instructions to retrieve calibration data.

20. The computer system of claim 15, wherein the display attributes comprise: color patterns, color matching, pattern matching, color density, border ratio, aspect ratio, pixels, brightness, contrast, sharpness, color balance, fuzziness, saturation, frequency, tracking, display mode, tint, H-position, V-position, white peaking, digamma, and color adjustment.

* * * * *